United States Patent
Rezaiifar et al.

(10) Patent No.: US 9,094,979 B2
(45) Date of Patent: Jul. 28, 2015

(54) LOAD BALANCING IN A WIRELESS COMMUNICATION SYSTEM

(75) Inventors: Ramin Rezaiifar, San Diego, CA (US); Rashid Ahmed A. Attar, San Diego, CA (US); Christopher G. Lott, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 427 days.

(21) Appl. No.: 12/466,151

(22) Filed: May 14, 2009

(65) Prior Publication Data

US 2009/0285159 A1   Nov. 19, 2009

Related U.S. Application Data

(60) Provisional application No. 61/054,027, filed on May 16, 2008.

(51) Int. Cl.
*H04W 72/00*   (2009.01)
*H04W 72/04*   (2009.01)
*H04W 72/02*   (2009.01)

(52) U.S. Cl.
CPC .......... *H04W 72/0486* (2013.01); *H04W 72/02* (2013.01); *H04W 72/042* (2013.01)

(58) Field of Classification Search
USPC ........................................................ 455/453
See application file for complete search history.

(56) References Cited

U.S. PATENT DOCUMENTS

| | | | |
|---|---|---|---|
| 7,110,765 B2 | 9/2006 | Amerga et al. | |
| 2002/0128031 A1* | 9/2002 | Valkealahti | 455/522 |
| 2004/0106423 A1* | 6/2004 | McGowan et al. | 455/522 |
| 2005/0136937 A1* | 6/2005 | Qian et al. | 455/452.2 |
| 2005/0164709 A1 | 7/2005 | Balasubramanian et al. | |
| 2006/0128394 A1* | 6/2006 | Turina et al. | 455/453 |
| 2006/0166677 A1* | 7/2006 | Derakshan et al. | 455/453 |
| 2007/0218913 A1* | 9/2007 | Chen | 455/450 |

FOREIGN PATENT DOCUMENTS

| | | |
|---|---|---|
| CN | 1860740 A | 11/2006 |
| CN | 1867181 A | 11/2006 |

(Continued)

OTHER PUBLICATIONS

International Search Report and Written Opinion—PCT/US2009/044228—ISAEPO—Nov. 26, 2009.

(Continued)

*Primary Examiner* — Mazda Sabouri

(74) *Attorney, Agent, or Firm* — Rupit M. Patel

(57) ABSTRACT

Techniques for selecting a serving sector for a terminal based on server selection information in order to balance the load of sectors in a wireless communication system are described. The server selection information for each sector may be set based on the load of the sector and may be used to rank the sector for selection as a serving sector. In one design, a terminal may receive server selection information for multiple sectors. The server selection information for each sector may include an offset used to adjust a measurement made by the terminal for the sector, a priority of the sector for selection as a serving sector, a DRCLock set based on the load of the sector, etc. The terminal may determine received signal qualities of the sectors. The terminal may then select one of the sectors as a serving sector based on the server selection information and the received signal qualities of the sectors.

28 Claims, 5 Drawing Sheets

(56) References Cited

FOREIGN PATENT DOCUMENTS

| | | | |
|---|---|---|---|
| CN | 101080937 A | 11/2007 |
| EP | 1133208 A2 | 9/2001 |
| JP | 2000286792 A | 10/2000 |
| JP | 2000295650 A | 10/2000 |
| JP | 2001298467 | 10/2001 |
| JP | 2002112302 A | 4/2002 |
| JP | 2002135825 A | 5/2002 |
| JP | 2005508588 | 3/2005 |
| JP | 2007525915 | 9/2007 |
| JP | 2008523711 A | 7/2008 |
| JP | 2011522471 A | 7/2011 |
| WO | 03009633 A1 | 1/2003 |
| WO | WO-2004021731 A2 | 3/2004 |
| WO | WO2005034438 | 4/2005 |
| WO | WO 2006065198 A1 | 6/2006 |
| WO | WO 2007025308 | 3/2007 |

OTHER PUBLICATIONS

Taiwan Search Report—TW098116174—TIPO—Jul. 9, 2012.

* cited by examiner

LOAD BALANCING IN A WIRELESS COMMUNICATION SYSTEM

The present application claims priority to provisional U.S. Application Ser. No. 61/054,027, entitled "METHOD AND APPARATUS FOR LOAD BALANCING IN A WIRELESS COMMUNICATIONS SYSTEM," filed May 16, 2008, assigned to the assignee hereof and incorporated herein by reference.

BACKGROUND

I. Field

The present disclosure relates generally to communication, and more specifically to techniques for communicating in a wireless communication system.

II. Background

Wireless communication systems are widely deployed to provide various communication services such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of terminals. The terminals may be dispersed throughout the system. Each base station may serve one or more terminals at any given moment. It may be desirable to serve the terminals such that good performance can be achieved for the terminals and the system.

SUMMARY

Techniques for performing server selection to balance the load of sectors in a wireless communication system are described herein. Server selection refers to a process to select a serving sector for a terminal. In an aspect, server selection may be performed based on server selection information for sectors. The server selection information for each sector may be set based on the load of the sector and may be used to rank the sector for selection as a serving sector. The server selection information may comprise various types of information, as described below.

In one design, a terminal may receive server selection information for multiple sectors. The terminal may determine received signal qualities of the sectors. The terminal may select one of the sectors as a serving sector based on the server selection information and the received signal qualities of the sectors. In one design, the server selection information for each sector may comprise an offset used to adjust a measurement made by the terminal for the sector. The terminal may determine an effective received signal quality of each sector based on the measured received signal quality and the offset for the sector. The terminal may then select the serving sector based on the effective received signal qualities of all sectors. In another design, the server selection information for each sector may indicate a priority of the sector for selection as a serving sector. The terminal may identify at least one sector having the highest priority based on the server selection information. The terminal may then select the sector with the highest received signal quality among the at least one sector as the serving sector. In yet another design, the server selection information for each sector may comprise a DRCLock that may be set based on the load of the sector, e.g., set to '0' if the load of the sector is heavy. The terminal may select the sector with the highest received signal quality among sectors having their DRCLock set to '1' as the serving sector. The server selection information may also comprise other information that may be used for server selection.

The server selection may be performed by a terminal, as described above, or by a network entity. Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as cdma2000, Universal Terrestrial Radio Access (UTRA), etc. cdma2000 covers IS-2000, IS-95 and IS-856 standards. IS-2000 Releases 0 and A are commonly referred to as CDMA2000 1X, 1X, etc. IS-856 is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for HRPD.

Figure 1:
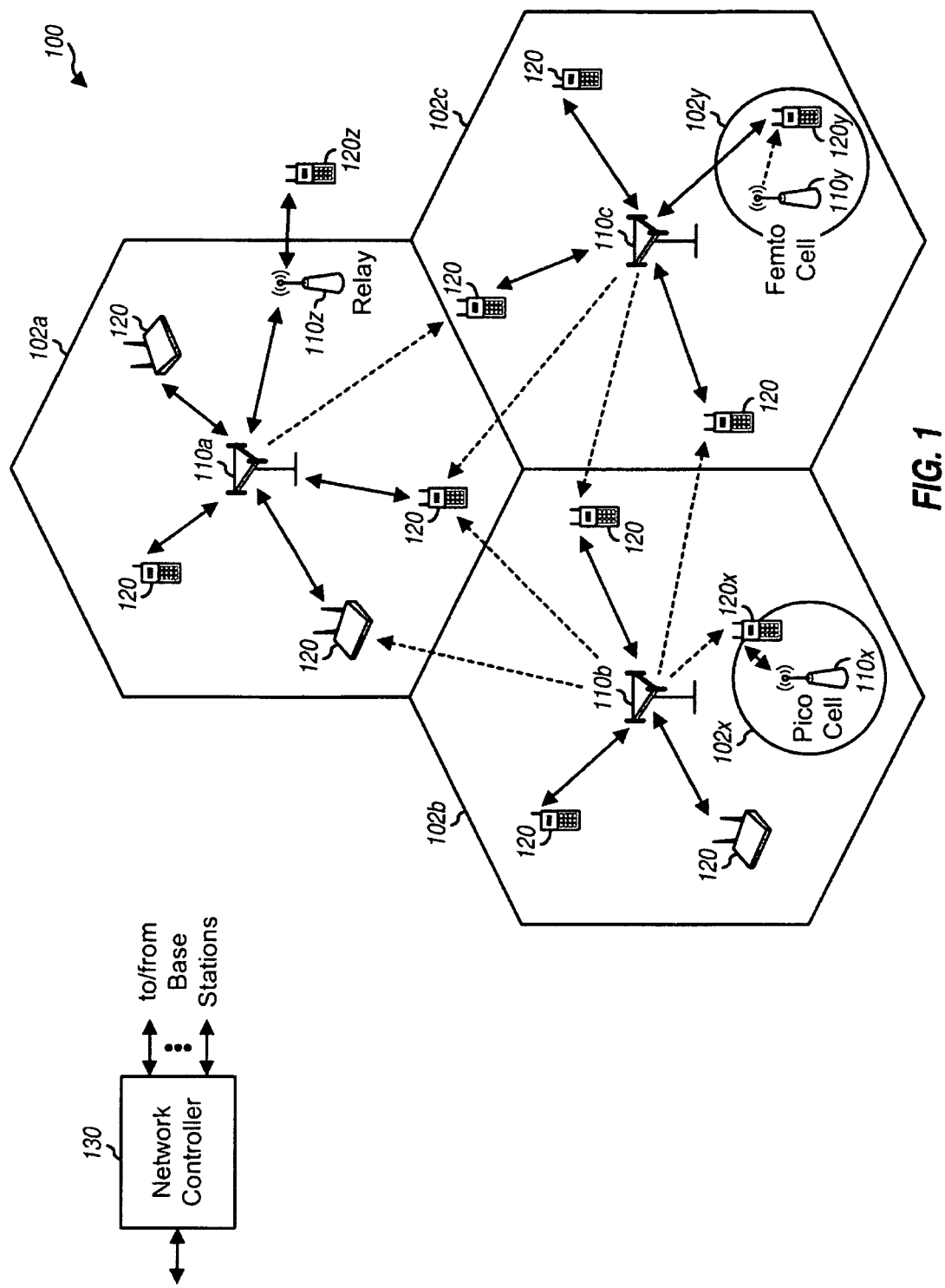
FIG. 1 shows a wireless communication system.

FIG. 1 shows a wireless communication system 100 with multiple base stations 110. A base station may be a station that communicates with the terminals and may also be referred to as an access point, a Node B, an evolved Node B (eNB), etc. Each base station 110 may provide communication coverage for a particular geographic area. To improve system capacity, the overall coverage area of a base station may be partitioned into multiple (e.g., three) smaller areas. Each smaller area may be served by a respective base station subsystem. In 3GPP, the term "cell" can refer to the smallest coverage area of a base station and/or a base station subsystem serving this coverage area. In 3GPP2, the term "sector" or "cell-sector" can refer to the smallest coverage area of a base station and/or a base station subsystem serving this coverage area. For clarity, 3GPP2 concept of "sector" is used in the description below. A base station may support one or multiple (e.g., three) sectors.

System 100 may include only macro base stations or base stations of different types, e.g., macro, pico, and/or femto base stations. A macro base station may cover a relatively large geographic area (e.g., several kilometers in radius) and may allow unrestricted access by terminals with service subscription. A pico base station may cover a relatively small geographic area (e.g., a pico cell) and may allow unrestricted access by terminals with service subscription. A femto or home base station may cover a relatively small geographic area (e.g., a femto cell) and may allow restricted access by terminals having association with the femto cell (e.g., terminals for users in a home). System 100 may also include relay stations, e.g., relay station 110z. The techniques described herein may be used for all types of base stations.

A network controller 130 may couple to a set of base stations and provide coordination and control for the base stations. Network controller 130 may communicate with the base stations via a backhaul. The base stations may also communicate with one another, e.g., via wireless or wireline backhaul.

Terminals 120 may be dispersed throughout system 100, and each terminal may be stationary or mobile. A terminal may also be referred to as a mobile station, a user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station via the forward and reverse links. The forward link (or downlink) refers to the communication link from the base station to the terminal, and the reverse link (or uplink) refers to the communication link from the terminal to the base station. In FIG. 1, a solid line with double arrows indicates data transmission between a terminal and a serving sector. A dashed line with a single arrow indicates forward link transmission from a non-serving sector to a terminal. A serving sector is a sector serving a terminal on the forward and/or reverse link.

The terminals may be distributed throughout the system, and each sector may have any number of terminals within its coverage. Some sectors may include many terminals and may be more heavily loaded whereas some other sectors may include few terminals and may be lightly loaded. In many instances, a heavily loaded sector may be adjacent to (e.g., surrounded by) one or more lightly loaded sectors.

In an aspect, load balancing may be performed to move terminals from a heavily loaded sector to a lightly sector in order to improve performance for all affected terminals as well as the system. Load balancing may be performed based on various designs, which may be dependent on the signaling messages available to send server selection information to terminals, whether server selection is performed by the terminals or a network entity (e.g., network controller 130), and/or other factors.

In a first load balancing design, server selection information for different sectors may be broadcast to terminals or sent to a network entity and used for server selection. The server selection information for a sector may comprise one or more parameters, and each parameter may be set based on the load of the sector. The server selection information for all candidate sectors that can potentially serve a terminal may be used along with pertinent measurements to select a serving sector for the terminal. The serving sector may thus be selected by taking into account the load of the candidate sectors.

The load of a given sector X may be quantified in various manners. In one design, the load of sector X may be given by the number of active terminals in sector X. For HRPD, an active terminal may be a terminal that points to sector X and has a non-empty queue at sector X. An active terminal may be defined in other manners for other systems. The number of active terminals in sector X may be determined periodically and may be filtered (e.g., with a filter time constant on the order of seconds or minutes) to average out fluctuations. The number of active terminals in sector X may be denoted as N. In one design, each active terminal's contribution to the sector load may be quantified by a value of one. In another design, each active terminal's contribution to the sector load may be determined by taking into account delay requirements, buffer size, and other characteristics of traffic for the terminal. For bursty traffic, as delay increases and the queue builds up, a terminal's contribution to the sector load may increase and may be quantified by a value greater than one. In any case, N may provide a rough measure of the sector load seen by a new incoming terminal and may provide an indication of the percentage of resources available to the new terminal if a proportional fairness scheduler is used.

In another design, the load of sector X may be determined based on resource utilization. For HRPD, data may be sent to terminals in units of time slots (or slots). The resource utilization may then be given by the percentage of slots used for data transmission among all available slots. In other systems, resource utilization may be given by the percentage of time, frequency and/or code resources used for data transmission among the available resources. In yet another design, the load of sector X may be determined based on the total queue size of all terminals being served, the delay requirements of the terminals, etc.

In yet another design, the load of sector X may be determined based on historical knowledge of the load of sector X. The sector load may also be determined based on time of day, date of week, etc. For example, sector X may cover a portion of a freeway, and the sector load may be heavy during commuting hours and light during non-commuting hours. As another example, sector X may cover a residential area, and the sector load may be heavy during evening hours and light during daytime hours. The load of sector X may also be determined in other manners.

Various parameters may be defined based on the load of sectors and used for server selection. In one design, an offset may be used as a parameter for load balancing and may be defined for a sector based on the load of the sector. The offset may be given in units of decibel (dB) and may be proportional to the sector load. For example, the offset may range from 0 to 10 dB, with 0 dB corresponding to light sector load and 10 dB corresponding to heavy sector load. In general, the offset may span any range of values and may be quantized to any number of values.

A serving sector may be selected for a terminal based on received signal quality, received signal strength, pathloss, etc. Received signal quality may be quantified by a signal-to-noise-and-interference ratio (SINR), a signal-to-noise ratio (SNR), an energy-per-chip-to-total-received-power ratio (Ec/Io), a carrier-to-interference ratio (C/I), etc. Received signal strength may be quantified by received pilot strength, received signal power, etc. For clarity, much of the following description assumes use of SINR for server selection.

In one design, an effective SINR may be computed for each sector m, as follows:

$$SINR_{EFF}(m) = SINR(m) - \text{Offset}(m), \qquad \text{Eq (1)}$$

where
Offset(m) is an offset for sector m,
SINR(m) is a measured SINR of sector m at a terminal, and
$SINR_{EFF}(m)$ an effective SINR of sector m.
The quantities in equation (1) are in units of dB.

As shown in equation (1), the load of a sector may be reflected in the offset and may be taken into account in the effective SINR of the sector. For a given measured SINR, the effective SINR may be progressively worse for progressively heavier sector load. The effective SINR may be computed for each candidate sector that can serve the terminal. The candidate sector with the highest effective SINR may be selected as the serving sector for the terminal. In HRPD, the serving sector is a sector that the terminal points to.

The terminal may have a serving sector $m_1$ and may periodically determine whether a better sector can serve the terminal. In one design, another sector may be selected as a new serving sector $m_2$ if the following conditions are satisfied:

$$SINR_{EFF}(m_2)-\text{Backoff} > SINR_{EFF}(m_1), \text{ and} \qquad \text{Eq (2)}$$

$$SINR(m_2) \geq SINR_{MIN}, \qquad \text{Eq (3)}$$

where
$SINR_{EFF}(m_1)$ and $SINR_{EFF}(m_2)$ are the effective SINRs of sectors $m_1$ and $m_2$,
Backoff is a backoff factor, which may be within a range of 0 to 3 dB, and
$SINR_{MIN}$ is a minimum SINR, which may be −5 dB or some other value.

The backoff factor may be used to control the selection of a new serving sector, e.g., to encourage switching of serving sector only if the difference between the loads of two sectors is sufficiently large. The design in equations (2) and (3) may ensure that the terminal would benefit from selecting another serving sector. If a new serving sector is selected, then terminals communicating with the old serving sector may benefit from lower sector load. Terminals communicating with the new serving sector may observe heavier sector load, which may be acceptable since the new serving sector may be lightly loaded.

In one design, each sector may periodically compute its load and send the load to network controller 130 in FIG. 1 (or some other designated network entity). Network controller 130 may determine the offset for each sector based on the load of the sector and possibly the load of neighbor sectors. In one design, the backoff factor may be a configurable value, which may be determined based on the load of the sectors. In another design, the backoff factor may be a fixed value, which may be selected to provide good performance. In one design, $SINR_{MIN}$ may be a configurable value, which may be determined based on the load of the sectors. In another design, $SINR_{MIN}$ may be a fixed value, which may be selected to provide good performance. In any case, for each sector, network controller 130 may send (i) a set of offsets for the sector and its neighbor sectors, (ii) the backoff factor if it is a configurable value, and (iii) $SINR_{MIN}$ if it is a configurable value. The sector may broadcast the set of offsets and the backoff factor and/or $SINR_{MIN}$ (if applicable) to terminals. The terminals may use the offsets, the backoff factor, and $SINR_{MIN}$ to select their serving sectors.

In another design, an offset may be defined for sector X based on the load of sector X as well as backhaul capability of sector X. Sector X may connect to network controller 130 via a backhaul having limited capability, e.g., a limited bandwidth. The backhaul capability may be worse than the air-link capability and may lead to under-utilization of the air-link at sector X. The load of sector X may appear light due to queue under-run resulting from the limited backhaul capability.

The offset may be defined to account for both the air-link load at sector X as well as the backhaul capability of sector X. In one design, the backhaul capability may be quantified by the number of unfilled flow control requests for a sector having non-empty queues at network controller 130. The backhaul capability may also be quantified in other manners. In any case, defining the offset by taking into account both the sector load and the backhaul capability may allow terminals to select suitable serving sectors with lighter load and/or better backhaul capability.

In one design, a single offset may be defined for each sector based on the sector load and possibly other factors (e.g., the backhaul capability). In another design, multiple offsets may be defined for different types of traffic for each sector. The offset for each traffic type may be defined based on a measure of sector load applicable for that traffic type. For example, one offset may be defined for expedited forwarding (EF) traffic having stringent delay requirements (i.e., delay-sensitive traffic), another offset may be defined for best effort (BE) traffic having relaxed delay requirements, etc. The offset for EF traffic may be defined based on (i) a ratio of effective bandwidth to an admission control target and/or (ii) some other criteria. The offset for BE traffic may be defined based on aggregate queue delay, slot utilization, number of served terminals, and/or other criteria.

In one design, each sector may autonomously determine its offset(s) based on its load and possibly other factors. In another design, each sector may send pertinent information to network controller 130, which may then determine the offset(s) for each sector. This design may split computational burden between the sectors and network controller 130.

In one design, each sector may broadcast server selection information determined based on its load. The server selection information may comprise one or more offsets, which may be determined as described above. In one design, the server selection information may comprise a B-bit offset for EF traffic and another B-bit offset for BE traffic, where B may be 2, 3, 4 or some other value. In another design, the server selection information may comprise a single B-bit offset for all traffic. This single offset may be applicable for all types of traffic or only certain traffic. For example, it may be desirable for EF traffic to not switch serving sectors for load balancing in order to avoid outage/delay impact. In this case, the offset may be applicable to BE traffic but not EF traffic. Each sector may broadcast the server selection information in a suitable signaling message (e.g., a Forward Traffic Channel Medium Access Control (FTCMAC) message in HRPD) at a suitable rate (e.g., every 3 to 10 seconds).

In one design, a terminal may select a serving sector based on the server selection information for different sectors. The terminal may maintain a set of candidate sectors that can serve the terminal, which may be referred to as an active set, a candidate set, a sector set, etc. A new sector may be added to the active set if the SINR of the sector is sufficiently high, and an existing sector may be removed from the active set if the SINR of the sector is sufficiently low. The terminal may select a serving sector from the active set as described above, e.g., using equations (1) to (3). If the server selection information for each sector includes offsets for different types of traffic, then the terminal may use the offset for the applicable traffic type at the terminal. For example, the terminal may use the offset for EF traffic if the terminal has an EF flow.

In another design, a designated network entity (e.g., the current serving sector or network controller 130) may select a serving sector for a terminal based on server selection information for different sectors.

In a second load balancing design, server selection information for candidate sectors may be sent to a terminal (instead of broadcast to all terminals) and used for server selection. A terminal may measure the SINR of each sector detected by the terminal and may update its active set based on the SINRs, as described above. The terminal may send a pilot measurement report with the SINRs of candidate sectors in its active set. The report may be sent, e.g., in a RouteUpdateRequest message in HRPD. Network controller 130 may receive the pilot measurement report from the terminal and the load of the candidate sectors in the active set. Network controller 130 may determine a metric for each candidate sector m for the terminal, as follows:

$$\text{Metric}(m) = f\{\text{SINR}(m), \text{Load}(m)\}, \quad \text{Eq (4)}$$

where
Load(m) is the load of sector m,
Metric(m) is the metric for sector m, and
f{ } is a function that maps the SINR and load of sector m to the metric.

In one design, the function $f\{\ \}$ may map the SINR and load of sector m to an estimated rate, as follows:

$$\text{Rate}(m) = \frac{g\{\text{SINR}(m)\}}{N(m)}, \quad \text{Eq (5)}$$

where
N(m) is the number of active terminals in sector m,
g{ } is a capacity function that maps SINR to a rate, and
Rate(m) is an estimated rate supported by sector m for the terminal.

In one design, candidate sectors with low metrics (e.g., low estimated rates due to heavy sector load) may be removed from consideration for server selection. In one design, each removed candidate sector may send information to indicate that the sector should not be selected as a serving sector. In another design, each remaining candidate sector in the active set may send information to indicate that the sector can be selected as a serving sector. For both designs, a serving sector may be selected for the terminal from among the remaining candidate sectors.

In one design, a DRCLock in HRPD may be used to convey removed candidate sectors. The active set of the terminal may include one or more candidate sectors, which may belong in one or more base stations. All candidate sectors of the same base station (or cell) may send a DRCLock to the terminal. The DRCLock is specific for the terminal and may be set to '1' to indicate that the system can receive a Data Rate Control (DRC) Channel and a Reverse Link Channel from the terminal or may be set to '0' otherwise. The terminal may select any candidate sector (e.g., a candidate sector with the highest SINR) having the DRCLock set to '1' as its serving sector. If no candidate sector has DRCLock set to '1', then the terminal may select any candidate sector as its serving sector. The DRCLock may thus be considered as a priority indication that favors selection of a candidate sector with DRCLock set to '1' over a candidate sector with DRCLock set to '0'.

Network controller 130 may receive the DRCLock for each candidate sector in the active set of the terminal. Network controller 130 may compute a metric for each candidate sector with DRCLock set to '1', e.g., as shown in equation (4) or (5).

In one design, network controller 130 may provide information indicating which sectors should not be considered for server selection. In one design, the DRCLock for a candidate sector with a sufficiently low metric (e.g., due to heavy sector load) may be set to '0' to discourage the terminal from selecting the sector. Since the DRCLock is applicable for all sectors of the same base station, the DRCLock may be set by taking into account the metrics of all sectors in the base station. In another design, a message comprising one or more offsets for each candidate sector and/or other information may be sent to the terminal. The terminal may then select a serving sector based on the information in the message.

In another design, network controller 130 may identify a candidate sector whose metric is sufficiently better than that of the current serving sector. The identified sector may be considered as a preferred sector for the terminal. Network controller 130 may persuade the terminal to select the preferred sector. In one design, the DRCLock for the preferred sector may be set to '1' and the DRCLock for remaining sectors may be set to '0'. In another design, a message containing the preferred sector may be sent to the terminal. This message may be a Traffic Channel Assignment (TCA) message comprising a NumUniqueForwardTrafficMACIndices, which is a set of MAC indices for the candidate sectors in the active set. The MAC index for the preferred sector may be set to '1' to encourage the terminal to select this sector, and the MAC indices for the remaining sectors may be set to '0'.

In one design, load balancing may be performed periodically, e.g., every T seconds, where T may be 10, 30 or 60 seconds or some other duration. Load balancing may be performed for one terminal at a time to simplify processing and avoid limit cycles. A terminal may be selected for load balancing based on its pilot measurement report. For example, a terminal with sufficiently high SINRs or sufficiently strong pilot strength for multiple sectors may be selected for load balancing.

Figure 2:
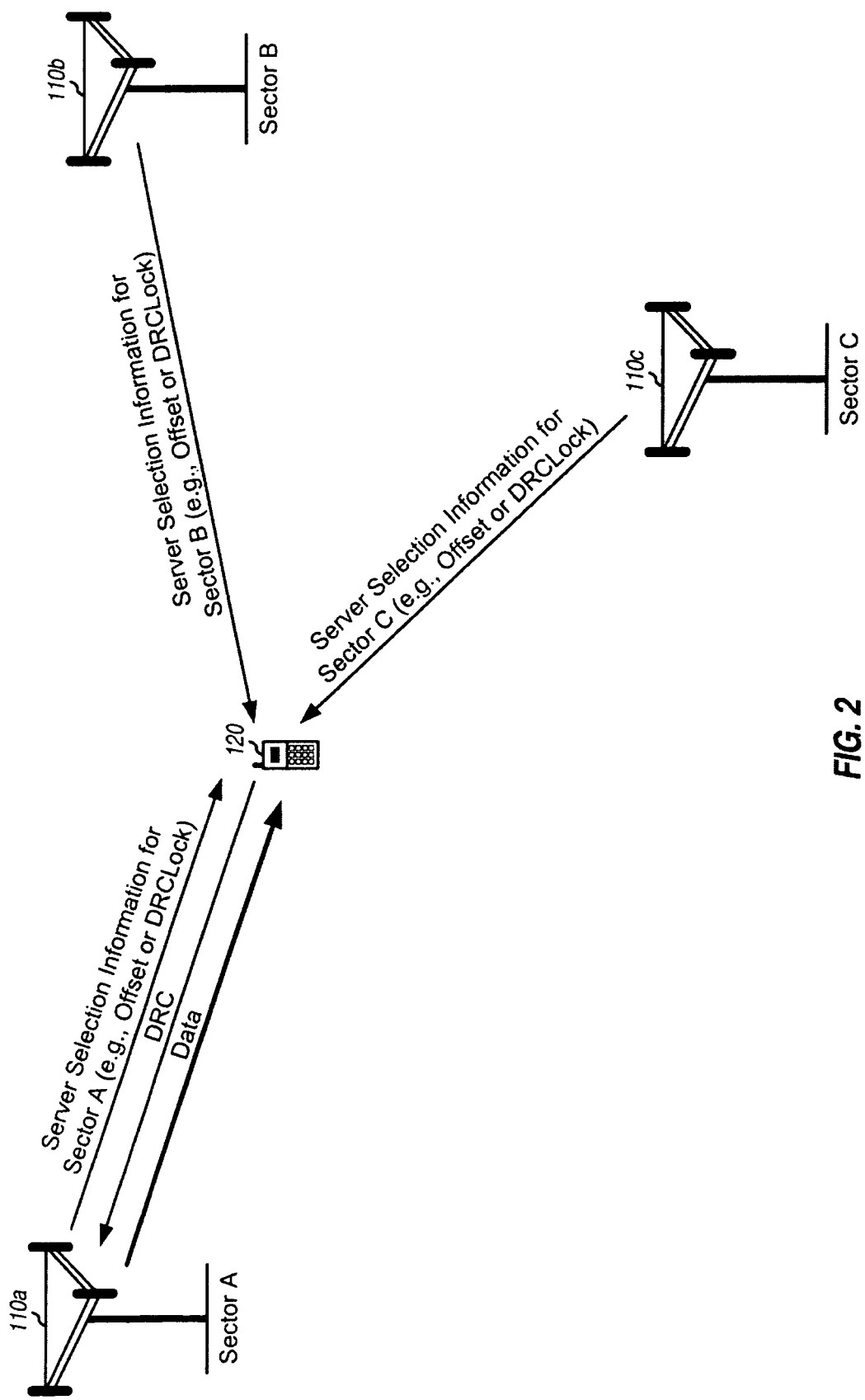
FIG. 2 shows server selection by a terminal.

FIG. 2 shows a design of server selection by a terminal 120, which may be one of the terminals in FIG. 1. In the example shown in FIG. 2, terminal 120 may have three sectors A, B and C in its active set. Terminal 120 may receive server selection information from each sector. The server selection information may comprise an offset, a DRCLock, etc. Terminal 120 may measure the SINR of each sector and may select a serving sector based on the measured SINR and the server selection information for each sector. Terminal 120 may send a DRC to the serving sector and may thereafter receive a data transmission from the serving sector.

In general, a terminal may have multiple sectors in its active set. The sector with the highest SINR may not be the most suitable sector to serve the terminal, e.g., due to heavy load at the sector. The techniques described herein may be used to persuade the terminal to select another sector (e.g., the next best sector) to serve the terminal. Server selection information may be provided to the terminal (e.g., via broadcast or unicast messages) to allow the terminal to perform server selection.

The load balancing techniques described herein may improve the performance of the system and the affected terminals. Some coverage-edge terminals in congested sectors may be served on the forward link by neighbor sectors in their active sets. Reducing the load of the congested sectors by offloading some terminals to neighbor sectors may improve system capacity A terminal may receive data on the forward link from a serving sector and may send feedback information on the reverse link to the serving sector. The serving sector may not be the best sector and may have a lower SINR for the terminal than the best sector. In one design, the terminal may boost the gains of feedback channels on the reverse link by a suitable amount (e.g., by a fixed value) in order to ensure negligible performance loss on the feedback channels.

Figure 3:
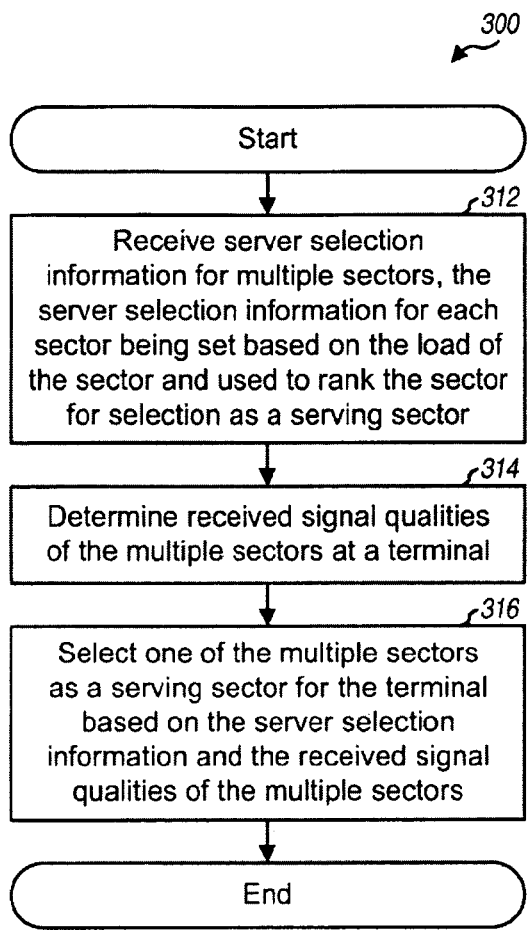
FIG. 3 shows a process for performing server selection.

FIG. 3 shows a design of a process 300 for performing server selection. Process 300 may be performed by a terminal, a base station, a network controller, or some other entity. Server selection information for multiple sectors may be received (block 312). The server selection information for each sector may be set based on the load of the sector and may be used to rank the sector for selection as a serving sector. Received signal qualities (e.g., SINRs) of the multiple sectors at a terminal may be determined (block 314). One of the multiple sectors may be selected as a serving sector for the terminal based on the server selection information and the received signal qualities of the multiple sectors (block 316).

In one design, the server selection information for each sector may comprise an offset used to adjust a measurement made by the terminal for the sector. In another design, the server selection information may comprise multiple offsets for different types of traffic. Each offset may be used to adjust a measurement made by the terminal for server selection for an associated type of traffic.

In one design of block 316, an effective received signal quality of each sector may be determined based on the measured received signal quality and the offset of the sector, e.g., as shown in equation (1). One sector may then be selected as the serving sector based on the effective received signal qualities of all sectors. For example, the sector with the highest effective received signal quality may be selected as the serving sector. As another example, the sector with an effective received signal quality exceeding a minimum value (e.g., $SINR_{MIN}$) and further exceeding the effective received signal quality of a current serving sector by a predetermined amount (e.g., a backoff) may be selected as a new serving sector, e.g., as shown in equations (2) and (3).

In another design, the server selection information for each sector may indicate a priority of the sector for selection as a serving sector. In one design of block 316, at least one sector having the highest priority among the multiple sectors may be identified based on the server selection information. The sector with the highest received signal quality among the at least one sector may then be selected as the serving sector for the terminal.

In yet another design, the server selection information for each sector may comprise a DRCLock that may be set based on the load of the sector. The DRCLock for each sector may be set to '0' if the load of the sector is heavy, e.g., exceed a particular threshold. In one design of block 316, at least one sector having DRCLock set to '1' may be identified among the multiple sectors. The sector with the highest received signal quality among the at least one sector may then be selected as the serving sector for the terminal.

The server selection information for each sector may also comprise other information indicative of the load at the sector. A serving sector may also be selected in other manners, depending on the content of the server selection information. For example, the server selection may be based on received signal strength or pathloss instead of received signal quality. In one design, the multiple sectors may be included in an active set of the terminal. The server selection information for the multiple sectors may be sent specifically to the terminal. In another design, the server selection information for the multiple sectors may be broadcast to all terminals.

Figure 4:
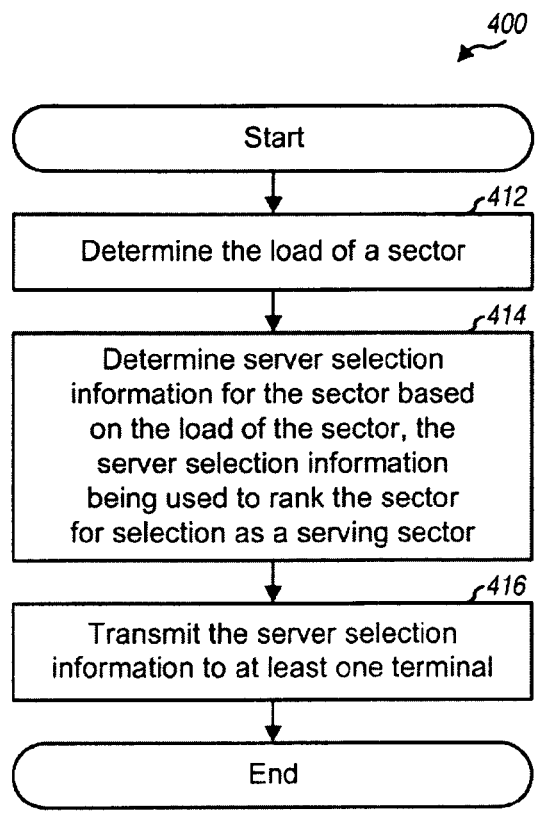
FIGS. 4, 5 and 6 show processes for supporting server selection.

FIG. 4 shows a design of a process 400 for supporting server selection. Process 400 may be performed by a base station, a network controller, or some other entity. The load of a sector may be determined (block 412). In one design, the load of the sector may be determined based on the number of terminals currently served by the sector and having non-empty queues. In another design, the load of the sector may be determined based on the percentage of resource utilization by the sector. The load of the sector may also be determined in other manners.

Server selection information for the sector may be determined based on the load of the sector (block 414). The server selection information may be used to rank the sector for selection as a serving sector. The server selection information may be transmitted to at least one terminal (block 416).

In one design, the server selection information may be set based further on received signal quality of the sector at a terminal. A metric for the sector may be determined based on the load of the sector and the received signal quality of the sector at the terminal, e.g., as shown in equation (4) or (5). The server selection information may then be set based on the metric for the sector. In one design, the server selection information may comprise a DRCLock. The DRCLock may be set to '0' if the load of the sector is heavy to indicate low priority of the sector for selection as a serving sector.

Figure 5:
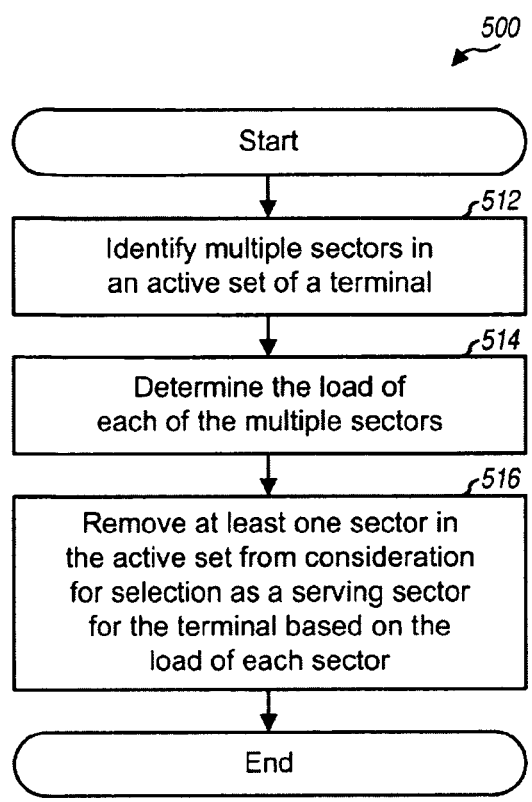

FIG. 5 shows a design of a process 500 for supporting server selection. Process 500 may be performed by a base station, a network controller, a terminal, or some other entity. Multiple sectors in an active set of a terminal may be identified (block 512). The load of each of the multiple sectors may be determined (block 514). At least one sector in the active set may be removed from consideration for selection as a serving sector for the terminal based on the load of each sector (block 516). In one design of block 516, a metric for each sector in the active set may be determined based on the load of the sector and received signal quality of the sector at the terminal, e.g., as shown in equation (4) or (5). The at least one sector may be selected for removal based on the metric for each sector in the active set.

In one design, server selection information for each of the at least one sector may be set to indicate low priority or low likelihood of selection as a serving sector for the terminal. Server selection information for each remaining sector may be set to indicate higher priority or higher likelihood of selection as a serving sector for the terminal. In one design, the server selection information for each sector may comprise an offset. The offset for each removed sector may be set to a high value, and the offset for each remaining sector may be set to a low value. In another design, the server selection information for each sector may comprise a DRCLock. The DRCLock for each removed sector may be set to '0', and the DRCLock for each remaining sector may be set to '1'.

Figure 6:
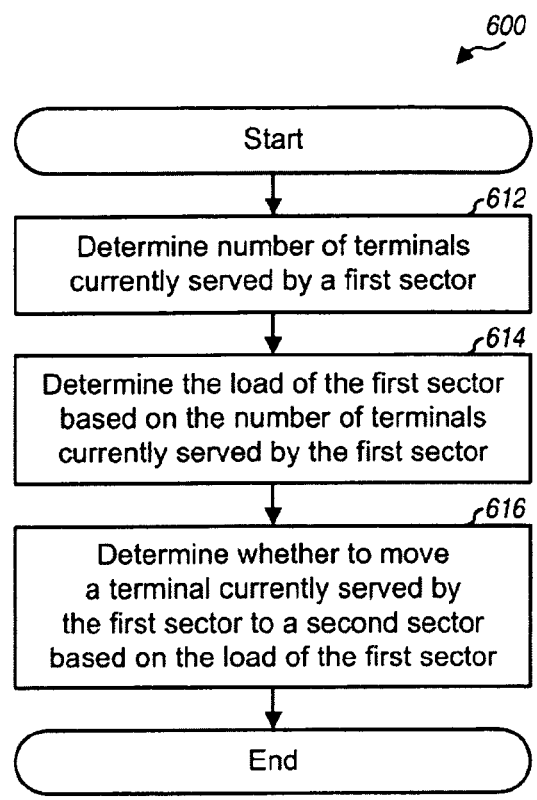

FIG. 6 shows a design of a process 600 for supporting server selection. Process 600 may be performed by a base station, a network controller, or some other entity. The number of terminals currently served by a first sector may be determined, e.g., based on the number of terminals selecting the first sector as a serving sector and having non-empty queues at the first sector (block 612). The load of the first sector may be determined based on the number of terminals currently served by the first sector (block 614). Whether to move a terminal currently served by the first sector to a second sector may be determined based on the load of the first sector (block 616). The terminal may be selected for load balancing from among all terminals currently served by the first sector based on a pilot measurement report from the terminal. The pilot measurement report may comprise pilot measurements for the first and second sectors and may indicate strong pilot strength for the second sector.

Figure 7:
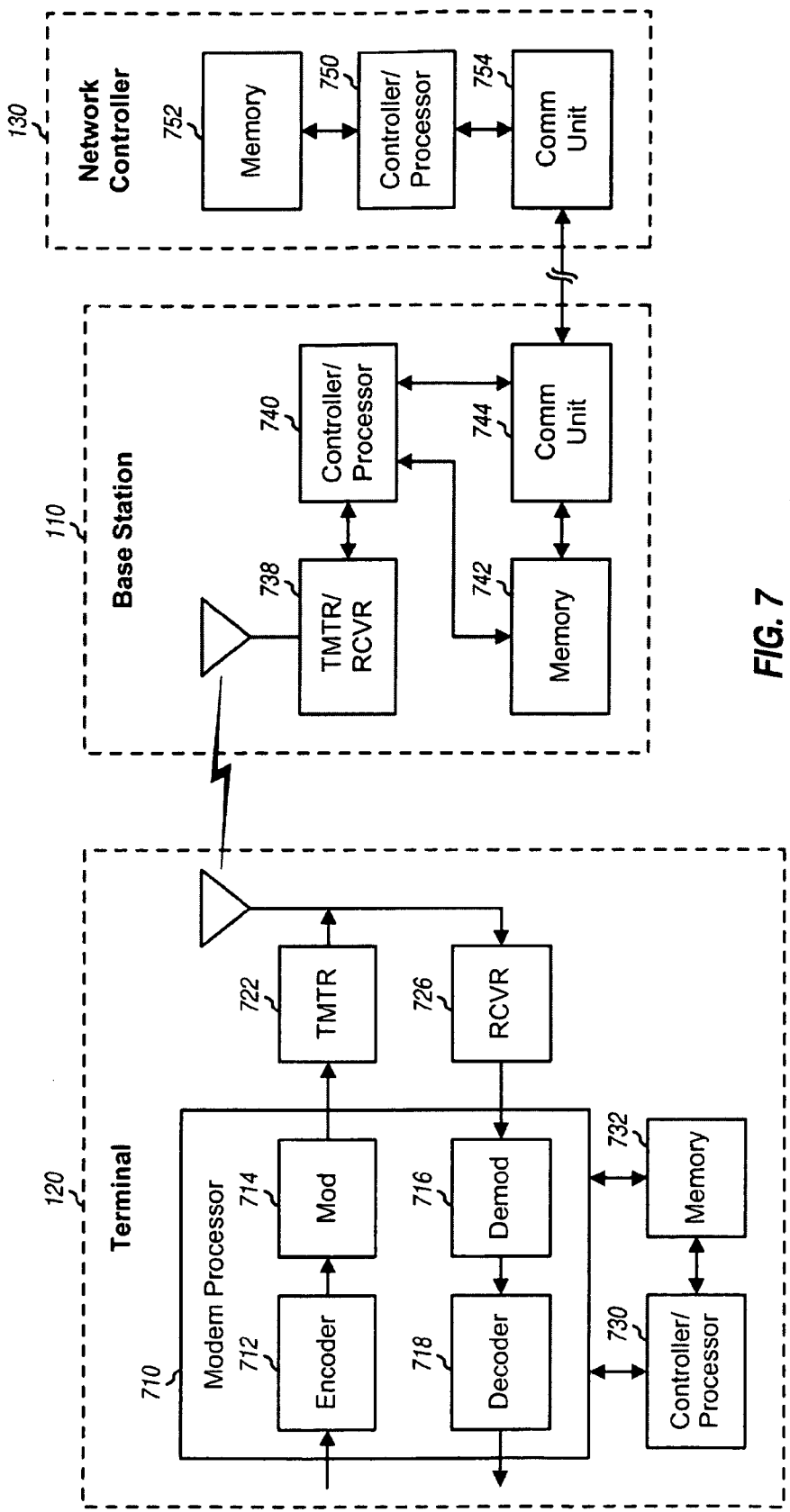
FIG. 7 shows a block diagram of a terminal, a base station, and a network controller.

FIG. 7 shows a block diagram of a design of terminal 120, base station 110, and network controller 130. At terminal 110, an encoder 712 may receive traffic data and signaling (e.g., for DRC) to be sent by terminal 120 on the reverse link. Encoder 712 may process (e.g., encode and interleave) the traffic data and signaling. A modulator (Mod) 714 may further process (e.g., modulate, channelize, and scramble) the encoded data and signaling and provide output samples. A transmitter (TMTR) 722 may condition (e.g., convert to analog, filter, amplify, and frequency upconvert) the output samples and generate a reverse link signal, which may be transmitted to base station 110.

On the forward link, terminal 120 may receive a forward link signal from base station 110. A receiver (RCVR) 726 may condition (e.g., filter, amplify, frequency downconvert, and digitize) a received signal and provide input samples. A demodulator (Demod) 716 may process (e.g., descramble, channelize, and demodulate) the input samples and provide symbol estimates. A decoder 718 may process (e.g., deinterleave and decode) the symbol estimates and provide decoded data and signaling sent to terminal 120. Encoder 712, modulator 714, demodulator 716 and decoder 718 may be implemented by a modem processor 710. These units may perform processing in accordance with the radio technology (e.g., HRPD, CDMA 1X, WCDMA, LTE, etc.) used by the system. A controller/processor 730 may direct the operation of various units at terminal 120. Processor 730 and/or other units at terminal 120 may perform or direct process 300 in FIG. 3, process 500 in FIG. 5, and/or other processes for the techniques described herein. Memory 732 may store program codes and data for terminal 120.

At base station 110, a transmitter/receiver 738 may support radio communication for terminal 120 and other terminals. A controller/processor 740 may perform various functions for communication with the terminals. On the reverse link, the reverse link signal from terminal 120 may be received and conditioned by receiver 738 and further processed by controller/processor 740 to recover the traffic data and signaling sent by the terminal. On the forward link, traffic data and signaling (e.g., for server selection information) may be processed by controller/processor 740 and conditioned by transmitter 738 to generate a forward link signal, which may be transmitted to terminal 120 and other terminals. Memory 742 may store program codes and data for the RAN. Controller/processor 740 may perform or direct process 400 in FIG. 4, process 500 in FIG. 5, process 600 in FIG. 6, and/or other processes for the techniques described herein. A communication (Comm) unit 744 may support communication with other network entities.

At network controller 130, a controller/processor 750 may perform various functions to support communication for terminals. Processor 750 and/or other units at network controller 130 may perform or direct process 400 in FIG. 4, process 500 in FIG. 5, process 600 in FIG. 6, and/or other processes for the techniques described herein. Memory 752 may store program codes and data for network controller 130. A communication unit 754 may support communication with other network entities.

FIG. 7 shows a simplified block diagram of some entities in FIG. 1. In general, each entity may include any number of processors, controllers, memories, transmitters/receivers, communication units, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    receiving server selection information for each among multiple sectors, wherein the server selection information for each sector comprises multiple sector-specific signal-to-interference-and-noise-ratio (SINR) offsets, wherein the multiple sector-specific SINR offsets are proportional to the load of the sector and wherein each of the multiple sector-specific SNIR offsets is associated with a different traffic type among a plurality of different types of traffic; and
    selecting a sector among the multiple sectors as a serving sector for a terminal, wherein the selecting is based at least in part on a measured received signal quality of the serving sector, the type of traffic for the terminal, and the sector-specific SNIR offset associated with said type of traffic, from among the multiple sector-specific SINR offsets for the serving sector.

2. The method of claim 1, further comprising
    measuring received signal quality, at the terminal, of sectors among the multiple sectors and generating, as a result, the measured received signal quality of each of said sectors;
    determining an effective received signal quality of each of said sectors based on the measured received signal quality of the sector and the sector-specific SINR offset that is associated with said type of traffic, and
    wherein the selecting is based at least in part on the effective received signal quality of the selected serving sector.

3. The method of claim 2, wherein the selecting comprises selecting, as the serving sector, a sector among the multiple sectors having a highest effective received signal quality.

4. The method of claim 2, wherein the selecting comprises selecting as the serving sector a sector with an effective received signal quality exceeding a minimum value and further exceeding an effective received signal quality of a current serving sector by a predetermined amount.

5. The method of claim 2, wherein the server selection information for each sector also indicates a priority of the sector for selection as a serving sector, and wherein the selecting is further based, at least in part, on the priority of the serving sector.

6. The method of claim 2, wherein the server selection information for each sector further comprises a Data Rate Control lock (DRCLock) set based on the load of the sector,
    wherein the DRCLock for each sector is set to '0' if loading of the sector is heavy, and
    wherein the selecting one of the multiple sectors as the serving sector for the terminal further comprises
    identifying at least one sector having DRCLock set to '1' among the multiple sectors, and selecting a sector with a highest effective received signal quality among the at least one sector as the serving sector for the terminal.

7. The method of claim 1, wherein the multiple sectors are included in an active set of the terminal, and wherein the server selection information for the multiple sectors is sent to the terminal.

8. The method of claim 1, wherein the server selection information for the multiple sectors is broadcast to all terminals.

9. An apparatus for wireless communication, comprising:
    means for receiving server selection information for multiple sectors, wherein the server selection information for each sector comprises multiple sector-specific signal-to-interference-and-noise-ratio (SINR) offsets, wherein the multiple sector-specific SINR offsets are proportional to the load of the sector and wherein each of the multiple sector-specific SNIR offsets is associated with a different traffic type among a plurality of different types of traffic; and
    means for selecting a sector among the multiple sectors as a serving sector for a terminal, wherein the selecting is based at least in part on a measured received signal quality of the serving sector, the type of traffic for the terminal, and the sector-specific SNIR offset associated with said type of traffic, from among the multiple sector-specific SINR offsets for the serving sector.

10. The apparatus of claim 9, wherein the means for selecting one of the multiple sectors as the serving sector for the terminal comprises
    means for measuring received signal quality at the terminal of sectors among the multiple sectors and generating, as a result, the measured received signal quality of each of said sectors, and
    means for determining an effective received signal quality of each of said sectors, for said type of traffic, based on the measured received signal quality of the sector and the sector-specific SINR offset associated with said type of traffic,
    wherein the selecting is based at least in part on the effective received signal quality of each of a plurality of the sectors including the selected serving sector.

11. The apparatus of claim 9, wherein the server selection information for each sector also indicates a priority of the sector for selection as a serving sector and wherein the selecting is further based, at least in part, on the priority of the serving sector.

12. The apparatus of claim 10, wherein the server selection information for each sector comprises a Data Rate Control lock (DRCLock) set based on the load of the sector
    wherein the DRCLock for each sector is set to '0' if loading of the sector is heavy, and
    wherein the selecting one of the multiple sectors as the serving sector for the terminal further comprises
    identifying at least one sector having DRCLock set to '1' among the multiple sectors, and selecting a sector with a highest effective received signal quality among the at least one sector as the serving sector for the terminal.

13. An apparatus for wireless communication, comprising:
at least one processor configured to
receive server selection information for each among multiple sectors, wherein the server selection information for each sector comprises multiple sector-specific signal-to-interference-and-noise-ratio (SINR) offsets, wherein the multiple sector-specific SINR offsets are proportional to the load of the sector and wherein each of the multiple sector-specific SINR offsets is associated with a different traffic type among a plurality of different types of traffic, and
select a sector among the multiple sectors as a serving sector for a terminal, based at least in part on a measured received signal quality of the serving sector, the type of traffic for the terminal, and the sector-specific SINR offset associated with said type of traffic, from among the multiple sector-specific SINR offsets for the serving sector.

14. The apparatus of claim 3 wherein the at least one processor is further configured to
measure received signal quality, at the terminal, of sectors among the multiple sectors at the terminal, and
determine an effective received signal quality of each of said sectors based on the measured received signal quality of the sector and the sector-specific SINR offset that is associated with said type of traffic,
and to select one of the multiple sectors as the serving sector based at least in part on the effective received signal quality of the serving sector.

15. The apparatus of claim 13, wherein the server selection information for each sector also indicates a priority of the sector for selection as a serving sector and wherein the at least one processor is further configured to select the serving sector based, at least in part, on the priority of the serving sector.

16. The apparatus of claim 13, wherein the server selection information for each sector comprises a Data Rate Control lock (DRCLock) set based on the load of the sector,
wherein the DRCLock for each sector is set to '0' if loading of the sector is heavy, and
wherein the at least one processor is further configured to select one of the multiple sectors as the serving sector for the terminal by identifying at least one sector having DRCLock set to '1' among the multiple sectors, and select a sector with a highest effective received signal quality among the at least one sector as the serving sector for the terminal.

17. A computer program product, comprising:
a non-transitory computer-readable medium comprising:
code for causing at least one computer to receive server selection information for each among multiple sectors, wherein the server selection information for each sector comprises multiple sector-specific signal-to-interference-and-noise-ratio (SINR) offsets, wherein the multiple sector-specific SINR offsets are proportional to the load of the sector and wherein each of the multiple sector-specific SNIR offsets is associated with a different traffic type among a plurality of different types of traffic; and
code for causing the at least one computer to select a sector among the multiple sectors as a serving sector for a terminal, and to perform the selecting based, at least in part, on a measured received signal quality of the serving sector, the type of traffic for the terminal, and the sector-specific SNIR offset associated with said type of traffic, from among the multiple sector-specific SINR offsets for the serving sector.

18. The apparatus of claim 9, wherein the apparatus is integrated with a terminal.

19. The apparatus of claim 13, wherein the apparatus is integrated with a terminal.

20. The computer program product of claim 17, wherein the computer-readable medium is integrated with a terminal.

21. A method for wireless communication, comprising:
identifying multiple sectors in an active set of a terminal;
determining a load of each of the multiple sectors using a sector-specific signal-to-interference-and-noise-ratio (SINR) offset that is proportional to the sector load; and
removing at least one sector in the active set from consideration for selection as a serving sector for the terminal based on the load of each sector,
wherein the removing at least one sector in the active set comprises
determining a metric for each sector in the active set based on the load of the sector and received signal quality of the sector at the terminal, and
selecting the at least one sector for removal based on the metric for each sector in the active set
wherein the metric for each sector comprises $$\text{Metric}(m) = \frac{R\{SINR(m)\}}{N(m)},$$

where
N(m) denotes number of terminals currently served by sector m,
SINR(m) denotes received signal quality of sector m at the terminal,
R{ } denotes a function mapping received signal quality to data rate, and
Metric(m) denotes a metric for sector m.

22. The method of claim 21, wherein Metric(m) is Rate(m), wherein Rate(m) is an estimated rate supported by sector m for the terminal.

23. An apparatus for wireless communication, comprising:
means for identifying multiple sectors in an active set of a terminal;
means for determining a load of each of the multiple sectors using a sector-specific signal-to-interference-and-noise-ratio (SINR) offset that is proportional to the sector load; and
means for removing at least one sector in the active set from consideration for selection as a serving sector for the terminal based on the load of each sector,
wherein the removing at least one sector in the active set comprises
determining a metric for each sector in the active set based on the load of the sector and received signal quality of the sector at the terminal, and
selecting the at least one sector for removal based on the metric for each sector in the active set
wherein the metric for each sector comprises $$\text{Metric}(m) = \frac{R\{SINR(m)\}}{N(m)},$$

where
- N(m) denotes number of terminals currently served by sector m,
- SINR(m) denotes received signal quality of sector m at the terminal,
- R{ } denotes a function mapping received signal quality to data rate, and
- Metric(m) denotes a metric for sector m.

24. The apparatus of claim 23, wherein Metric(m) is Rate(m), wherein Rate(m) is an estimated rate supported by sector m for the terminal.

25. A computer program product, comprising:
a non-transitory computer-readable medium comprising:
code for causing at least one computer to identify multiple sectors in an active set of a terminal;
code for causing at least one computer to determine a load of each of the multiple sectors using a sector-specific signal-to-interference-and-noise-ratio (SINR) offset that is proportional to the sector load; and
code for causing at least one computer to remove at least one sector in the active set from consideration for selection as a serving sector for the terminal based on the load of each sector, wherein said code comprises code for causing at least one computer to
determine a metric for each sector in the active set based on the load of the sector and received signal quality of the sector at the terminal, and
select the at least one sector for removal based on the metric for each sector in the active set, wherein the metric for each sector comprises $$\text{Metric}(m) = \frac{R\{SINR(m)\}}{N(m)},$$

where
- N(m) denotes number of terminals currently served by sector m,
- SINR(m) denotes received signal quality of sector m at the terminal,
- R{ } denotes a function mapping received signal quality to data rate, and
- Metric(m) denotes a metric for sector m.

26. The computer program product of claim 25, wherein Metric(m) is Rate(m), wherein Rate(m) is an estimated rate supported by sector m for the terminal.

27. An apparatus for wireless communication, comprising:
at least one processor configured to
identify multiple sectors in an active set of a terminal;
determine a load of each of the multiple sectors using a sector-specific signal-to-interference-and-noise-ratio (SINR) offset that is proportional to the sector load; and
remove at least one sector in the active set from consideration for selection as a serving sector for the terminal based on the load of each sector,
wherein the processor is configured to the remove at least one sector in the active set co
determining a metric for each sector in the active set based on the load of the sector and received signal quality of the sector at the terminal, and
selecting the at least one sector for removal based on the metric for each sector in the active set,
wherein the metric for each sector comprises $$\text{Metric}(m) = \frac{R\{SINR(m)\}}{N(m)},$$

where
- N(m) denotes number of terminals currently served by sector m,
- SINR(m) denotes received signal quality of sector m at the terminal,
- R{ } denotes a function mapping received signal quality to data rate, and
- Metric(m) denotes a metric for sector m.

28. The apparatus of claim 27, wherein Metric(m) is Rate(m), wherein Rate(m) is an estimated rate supported by sector m for the terminal.

\* \* \* \* \*